Patented Mar. 19, 1929.

1,705,757

UNITED STATES PATENT OFFICE.

WILLIAM C. GEER AND HERBERT A. WINKELMANN, OF AKRON, OHIO, ASSIGNORS TO THE B. F. GOODRICH COMPANY, OF NEW YORK, N. Y., A CORPORATION OF NEW YORK.

HEAT PLASTIC DERIVATIVE OF RUBBER.

No Drawing. Application filed April 28, 1925. Serial No. 26,540.

This invention relates to heat plastic derivatives of rubber prepared by the action of isomerizing agents on rubber, or similar gum, these derivatives being of the same general character as the products described in the patent application of H. L. Fisher, Serial No. 758,099, filed December 26, 1924, and entitled "Rubber isomer and method of producing same", in which application are disclosed reaction products of rubber with isomerizing agents having the general formula R—$SO_2$—X, wherein R is an organic radical or hydroxy group and X is a hy-, droxy group or chlorine, such as the sulfonyl chlorides, the sulfonic acids, sulfuric acid, and mixtures of these acid reagents.

The main object of this invention is to provide heat plastic reaction products of rubber of a high degree of uniformity and to obtain products having improved physical properties, particularly better ageing and lower water absorption in comparison with the products of the Fisher application. Further objects are to provide improved methods of producing such products in which the time of mixing the ingredients on a mill and the time required to complete the reaction of the ingredients shall be diminished, and in which the acidic content of the active reagents may be uniformly predetermined without especial standardization thereof.

We find that many of the softeners, fluxes or flowing agents, which heretofore have been employed in the compounding of rubber, have additional advantages in the preparation of heat plastic derivatives of rubber when added to the raw or crude rubber prior to mixing in the isomerizing agent. They exert a softening effect on the raw rubber, facilitate the dispersion of the isomerizing agent during mastication and cut down the time of performing this operation, as well as producing a more uniform mixture of the latter with the rubber, generally reduce the time of reaction, and provide a reaction product of higher homogeneity, better ageing qualities and lower water absorption. We have found these advantages to result especially from the employment of distillates from resinous woods, such as pine tar and turpentine, distillates from coal tar, such as phenol and naphthalene, and distillates from petroleum, such as kerosene and paraffin. Further, vegetable oils, waxes and pitches, such as palm oil, Montan wax and hard wood pitch, and numerous other rubber softeners, particularly ceresin, oleic acid, stearic acid, nitro phenol, benzaldehyde, furfural, aldol, toluene, xylene, p-cymene, trichlorethylene, anisole, phthalic anhydride and the like, are examples of softeners which we have found to produce these beneficial results in a greater or less degree.

These advantages are well illustrated in the production of the sulfuric acid reaction product of rubber. Whereas it is difficult to mix more than 5% of concentrated sulfuric acid into raw rubber, we find that by first mixing into raw rubber 3 to 5% of one of the softeners above enumerated, for example, pine tar, we can then mix into the rubber without difficulty 10% to 15% of the concentrated acid in a much shorter time than is required to mix in the smaller amount of acid without first adding the softener. Moreover, 5% of sulfuric acid mixed with raw rubber requires 12 to 15 hours at 140° C. to complete satisfactorily the reaction, while the reaction of the acid in the mixture to which pine tar has been added, as above described, is completed in about 2 hours at the same temperature, the reaction product having improved physical properties and greater homogeneity.

In the reaction just described, the sulfuric acid acts in part with the pine tar to form sulfonic acids which in turn react with rubber to effect the desired change therein and quite probably the sulfuric acid acts in part directly upon the rubber. It is evident, therefore, that instead of reacting on rubber with sulfonic acids, we may mix directly into rubber the reagents from which the sulfonic acids are made. Thus phenol, or pine tar, which is a mixture of resinous acids and phenols, may be mixed directly into raw rubber followed by the addition of sulfuric acid, with the result that sulfonic acids are directly formed in the rubber and are more uniformly dispersed therein than when the sulfonic reagent is first prepared and then mixed into the rubber.

It is to be understood, however, that softeners differ somewhat widely in their reactivity in relation to the reagents capable of effecting the changed properties of rubber described in the Fisher application before referred to. The beneficial function of a softener of the character included herein seems to be primarily due to its property of being mutually miscible with rubber and with these acid reagents and is not wholly dependent upon the chemical reactivity of the softener with the reagent. Desirable properties for many purposes may be developed in these thermoplastics from the addition of larger proportions of softener than would suffice to secure the advantages in procedure above enumerated. For example, as high as 30 to 50 parts by weight of a softener to 100 parts of raw rubber may be added prior to or simultaneously with the addition of the acid reagent with satisfactory results.

The examples below are given merely by way of illustration, it being understood that the proportions of the softener to the rubber may be widely varied for the purpose of imparting to the final product desirable physical properties without sacrificing the benefits in the preparation of the product hereinabove noted.

*Example I.*—A balata-like derivative of rubber is obtained by working into 100 parts by weight of crude rubber 3 parts of pine tar followed by 7 parts of concentrated sulfuric acid (sp. gr. 1.84). The mix is heated, as in an oven, until a pronounced exothermal temperature rise takes place within the mass, the temperature rapidly rising to 200–250° C. In case of the above recipe, heating in an oven at 130° C. for 75 minutes has been found to be sufficient, but preferably the heating should be continued for about two hours after the maximum temperature in the mass has been reached. After cooling, the product is masticated on a warm mill to ensure homogeneity and it is preferably washed free of remaining acid and other water-soluble impurities during that process. The product when freed from all impurities is found upon analysis to contain only carbon and hydrogen in the proportion of $C_5H_8$ and to be chemically less unsaturated than rubber, and consequently to be an isomer of rubber, using this term in a generic sense. The use of 10 parts of acid, instead of 7 parts as above, produces a brittle, shellac-like derivative of rubber. Products similar to those just described but having a lower softening or remolding temperature and suitable for the production of molded articles may be prepared by utilizing 30 to 50 parts of pine tar to 100 parts of rubber in which case the amount of acid for either the balata-like or shellac-like products should be slightly increased. These products have the advantage of being lower in cost and of having a tensile strength substantially equal to that of the products containing relatively small proportions of pine tar.

*Example II.*—Rubber is mixed with 2.5 to 3.5 percent by weight of phenol. 3.5 to 4.5 percent of concentrated sulfuric acid (sp. gr. 1.84) is then milled into the mix and the mass is heated for about 6 hours at 140° C. After cooling, the resultant product is masticated to homogenize it and washed to remove water-soluble impurities. The reaction product is very similar to that obtained when 7.5 percent of phenol sulfonic acid is milled into rubber and heated for the same time and temperature, as described in the Fisher application above referred to, with the exception that the product herein described is more homogeneous, has better ageing properties and a lower water absorption capacity, and is less expensive to produce.

*Example III.*—Organic sulfonic acids and organic sulfonyl chlorides of the type represented by the general formula $R-SO_2-X$, where R represents an organic radical or hydroxy group and X represents a hydroxy group or chlorine, may also be employed in the above described processes. Thus, 2 parts by weight of pine tar and 9 parts of p-toluene sulfonic acid are worked into 100 parts of rubber in the manner described in Example I. The mix is heated, as in an oven, for about 8 hours at 130° C. The product is then cooled, masticated to homogenize it and may be washed to remove water-soluble impurities. The reaction product is a hard, tough, thermoplastic material. Similarly, when two parts of pine tar, 10 parts of p-toluene sulfonyl chloride and 100 parts of rubber are reacted in the above described manner, a hard, brittle, shellac-like material is produced.

We do not wholly limit our claims to the specific softeners hereintofore mentioned, since the function of such softeners is apparently due to their miscibility with rubber and with the acid reagent, nor do we wholly limit our claims to the addition of a softener to the rubber prior to the incorporation of the acid reagent, since the addition of the softener after the addition of the reagent, or the addition of the two together, will beneficially affect the reaction and quality of the resulting product.

We claim:

1. The method of producing a composition of matter which comprises directly incorporating into rubber a rubber softener and an isomerizing agent for rubber, supplying heat to the mix until it has assumed an inelastic thermoplastic condition, and masticating the product to homogenize it.

2. The method of producing a composition of matter which comprises masticating a mixture of undissolved rubber and a rubber softener, adding thereto an isomerizing agent for rubber, applying heat to the mix sufficient to cause a pronounced exothermal reaction therein, and reworking the resulting product to homogenize it.

3. The method of producing a composition of matter which comprises working into rubber a rubber softener, adding thereto a reagent containing the grouping R—SO$_2$—X, wherein R represents an organic radical or a hydroxy group and X represents chlorine or a hydroxy group, applying heat to the mix sufficient to cause a pronounced exothermal reaction therein, and reworking the resulting product to homogenize it.

4. The method according to claim 3 in which the sulfonic compound is in substantial part, at least, sulfuric acid.

5. The method of producing a composition of matter which comprises masticating rubber with a softener capable of reacting with sulfuric acid, subsequently adding sulfuric acid, applying heat to the mix sufficient to cause a pronounced exothermal temperature rise therein, and reworking the product to homogenize it.

6. The method of producing a composition of matter which comprises working into rubber a product of distillation of resinous woods, adding thereto an isomerizing agent for rubber, and applying heat to the mix sufficient to cause a pronounced exothermal temperature rise therein.

7. The method according to claim 6 in which the product of distillation is pine tar.

8. The method according to claim 6 in which the isomerizing agent is sulfuric acid.

9. The method of producing a composition of matter which comprises working into rubber pine tar and sulfuric acid, and applying heat to the mix sufficient to cause a pronounced exothermal termperature rise therein.

10. The method of producing a composition of matter which comprises working into crude rubber pine tar and sulfuric acid, and applying heat to the mix sufficient to cause a pronounced exothermal temperature rise therein, the ingredients being employed within the range of proportions following: crude rubber, 100 parts by weight; pine tar, 2 to 50 parts; concentrated sulfuric acid 3 to 15 parts.

11. A composition of matter comprising the high-temperature reaction product of an intimate mixture of rubber and a rubber softener with an isomerizing agent for rubber, the latter being incorporated into the rubber mix without causing any pronounced reaction therewith and then the mix heated to effect a pronounced exothermal reaction.

12. A composition of matter comprising the high-temperature reaction product of an intimate mixture of rubber and a distillation product of resinous woods with an isomerizing agent for rubber, the latter being incorporated into the rubber mix without causing any pronounced reaction therewith and then the mix heated to effect a pronounced exothermal reaction.

13. A composition of matter comprising the high-temperature reaction product of an intimate mixture of rubber and pine tar with an isomerizing agent for rubber.

14. A composition of matter comprising the high-temperature reaction product of an intimate mixture of rubber and a rubber softener with a reagent containing the grouping R—SO$_2$—X, wherein R represents an organic radical or a hydroxy group and X represents chlorine or a hydroxy group, the latter being incorporated into the rubber mix without causing any pronounced reaction therewith and then the mix heated to effect a pronounced exothermal reaction.

15. A composition of matter comprising a high-temperature reaction product of an intimate mixture of rubber and a rubber softener with concentrated sulfuric acid, the latter being incorporated into the rubber mix without causing any pronounced reaction therewith and then the mix heated to effect a pronounced exothermal reaction.

16. A composition of matter comprising a high-temperature reaction product of sulfuric acid with an intimate mixture of rubber and a rubber softener capable of reacting with sulfuric acid, the latter being incorporated into the rubber mix without causing any pronounced reaction therewith and then the mix heated to effect a pronounced exothermal reaction.

17. A composition of matter comprising a high-temperature reaction product of an intimate mixture of rubber and pine tar with concentrated sulfuric acid.

18. A composition of matter comprising a high-temperature reaction product of an intimate mixture of rubber and pine tar with concentrated sulfuric acid, in which the ingredients are employed within the range of proportions following: crude rubber 100 parts by weight, pine tar 2 to 50 parts, concentrated sulfuric acid 3 to 15 parts.

In witness whereof we have hereunto set our hands this 21st day of April, 1925.

WILLIAM C. GEER.
HERBERT A. WINKELMANN.